US005760380A

United States Patent [19]

May

[11] Patent Number: 5,760,380
[45] Date of Patent: Jun. 2, 1998

[54] SHUTTER MECHANISM FOR CARD CONTROLLED SELF-SERVICE TRANSACTION TERMINAL

[75] Inventor: David C. C. May, Darsie, Scotland

[73] Assignee: NCR Corporation, Dayton, Ohio

[21] Appl. No.: 664,950

[22] Filed: Jun. 14, 1996

[30] Foreign Application Priority Data

Dec. 22, 1995 [GB] United Kingdom ............ 9526335

[51] Int. Cl.⁶ .................. G06F 17/60; G06K 7/00; G06K 19/00
[52] U.S. Cl. ................ 235/379; 235/486; 235/475
[58] Field of Search ................ 235/375, 379, 235/482, 475, 476, 477–478, 479; 194/204, 346, 351, 203, 206, 210, 207, 202

Primary Examiner—Donald T. Hajec
Assistant Examiner—Thien Minh Le
Attorney, Agent, or Firm—Michael Chan

[57] ABSTRACT

A shutter mechanism (40) for a self-service transaction terminal (10) includes a shutter in the form of a hollow cylinder (42) having a slot (46). The shutter (42) is rotatable about a core member (44) from an open position wherein the slot (46) is aligned with a card entry slot (24) in the terminal (10) to a closed position wherein the slot (46) is aligned with a feed path (90) along which a card (70) may be fed to a reader/writer (94). The core member (44) is provided with a slot (78) and card feed rollers (60.62). When the card (70) is fed reversely after processing, the shutter (42) rotates from the closed to the open position where the user can withdraw the card (70). The shutter construction prevents unauthorized access to the card reader/writer (94) via the card entry slot (24) of the terminal (10).

7 Claims, 4 Drawing Sheets

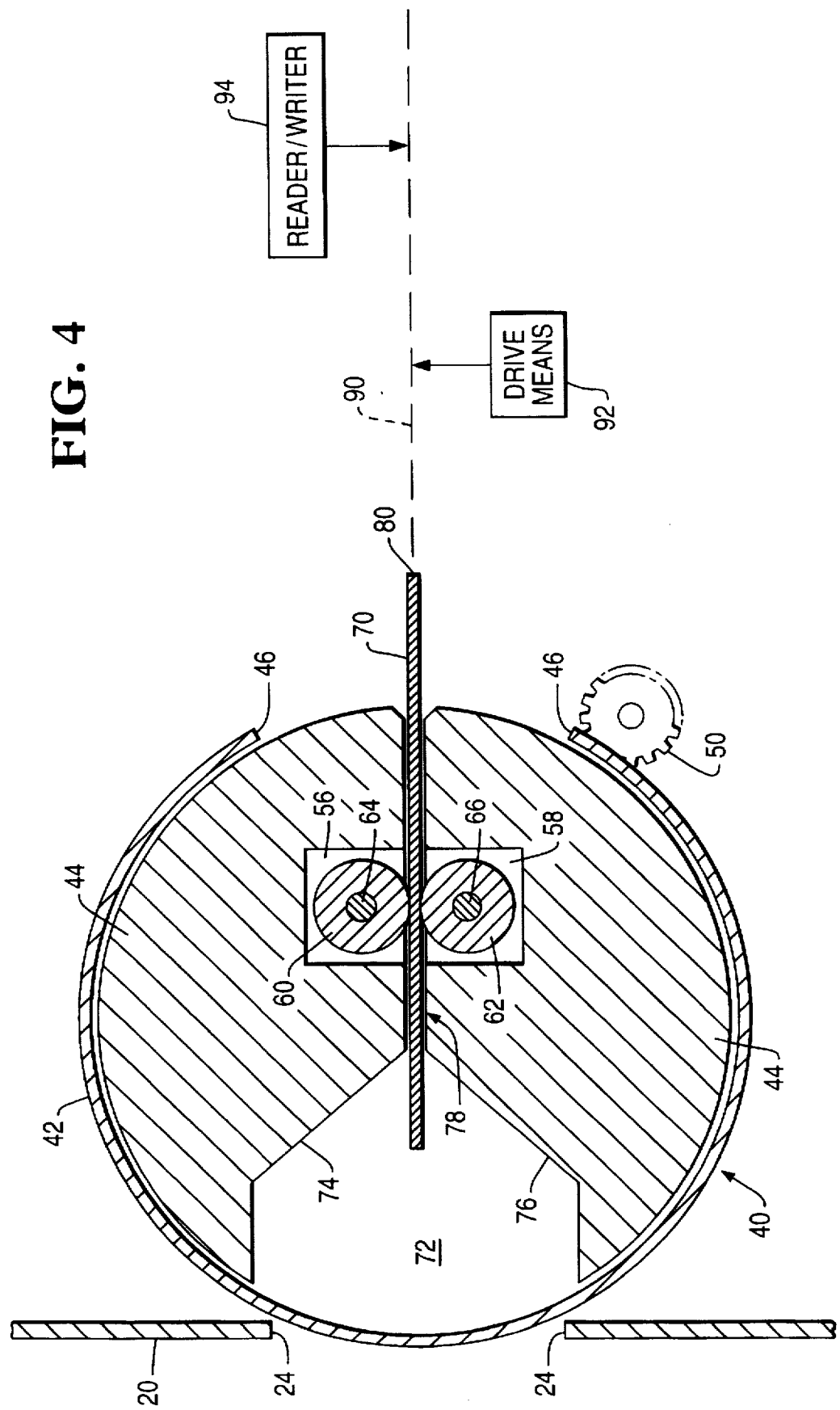

5,760,380

SHUTTER MECHANISM FOR CARD CONTROLLED SELF-SERVICE TRANSACTION TERMINAL

BACKGROUND OF THE INVENTION

This invention relates to self-service terminals of the kind operable under the control of a user card to effect a transaction.

Typically, such a terminal includes card handling apparatus having input means adapted to receive a card from a user of the apparatus, a card utilization device, card feeding means, control means adapted in operation to control the card feeding means to feed a received card inward from said input means to the utilization device and outward after utilization to a position wherein the card partially protrudes from said input means.

An important application of such self-service terminals is in the field of automatic banking, where automated teller machines (ATMs) are in common use. Typically, in an ATM, a user insert a service card into the machine and then enters certain data (PIN number, quantity of currency, type of transaction etc.) into a keyboard associated with the machine. The machine will then process the transaction, update the user's bank account if necessary and return the card to a partially protruding position from which it can be removed by user.

In a known ATM, when a card is initially inserted in the machine's card entry slot, a sensor senses that the object being inserted is a correct card. For example, if the card must have a magnetic stripe thereon, a sensor can sense that such magnetic stripe is present and if so, cause a flat shutter member located behind the slot to be raised and permit further entry of the card along a feed path for engagement by feed rollers or other feed means which operate to feed the card fully into the machine and into a location for cooperation with a card processing means such as a magnetic reader/writer device, for example. A disadvantage of this known ATM is that it may be possible for a fraudulent person to enter foreign material at the same time as a magnetic stripe card and thereby jam the shutter open and obtain unauthorized direct access to the card reader/writer.

SUMMARY OF THE INVENTION

It is an object of the present invention to provide a card operated self-service terminal wherein the possibility of unauthorized access to a card processing means within the terminal is reduced.

Therefore, according to the present invention, there is provided a self-service transaction terminal having a user card entry control shutter mechanism, characterized in that said shutter mechanism includes a hollow cylindrical shutter having a slot therein adapted to receive a user card inserted into said terminal, said hollow cylindrical shutter having a dimension such that an inserted card can be contained therewithin.

BRIEF DESCRIPTION OF THE DRAWINGS

Two embodiments of the present invention will now be described by way of example, with reference to the accompanying drawings, in which:

FIG. 4 is a cross-sectional view of the shutter mechanism shown in FIG. 2, with an inserted user card in a second position.

DETAILED DESCRIPTION

Figure 1:
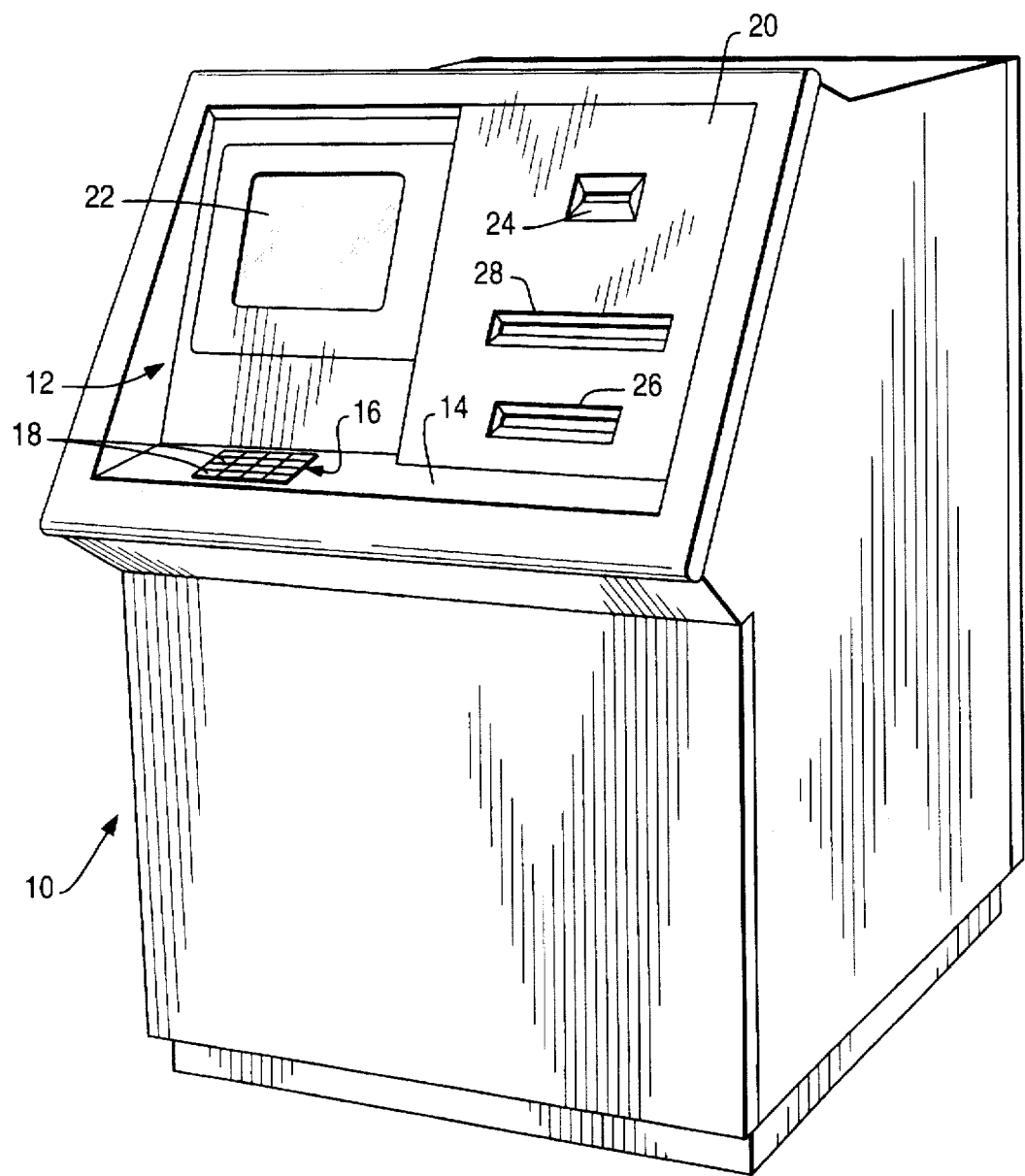
FIG. 1 is a perspective view of an automated teller machine (ATM)

Referring first to FIG. 1, there is shown a perspective view of an automated teller machine (ATM) 10. The ATM 10 has a user interface 12 which includes a first housing portion 14 provided with a keyboard 16 having a plurality of keys 18. A second housing portion 20 is provided with a display 22, a slot 24 for receiving a user card, a cash dispensing slot 26 and a printer output slot 28 for issuing receipt slips or other printed items to the user.

Figure 2:
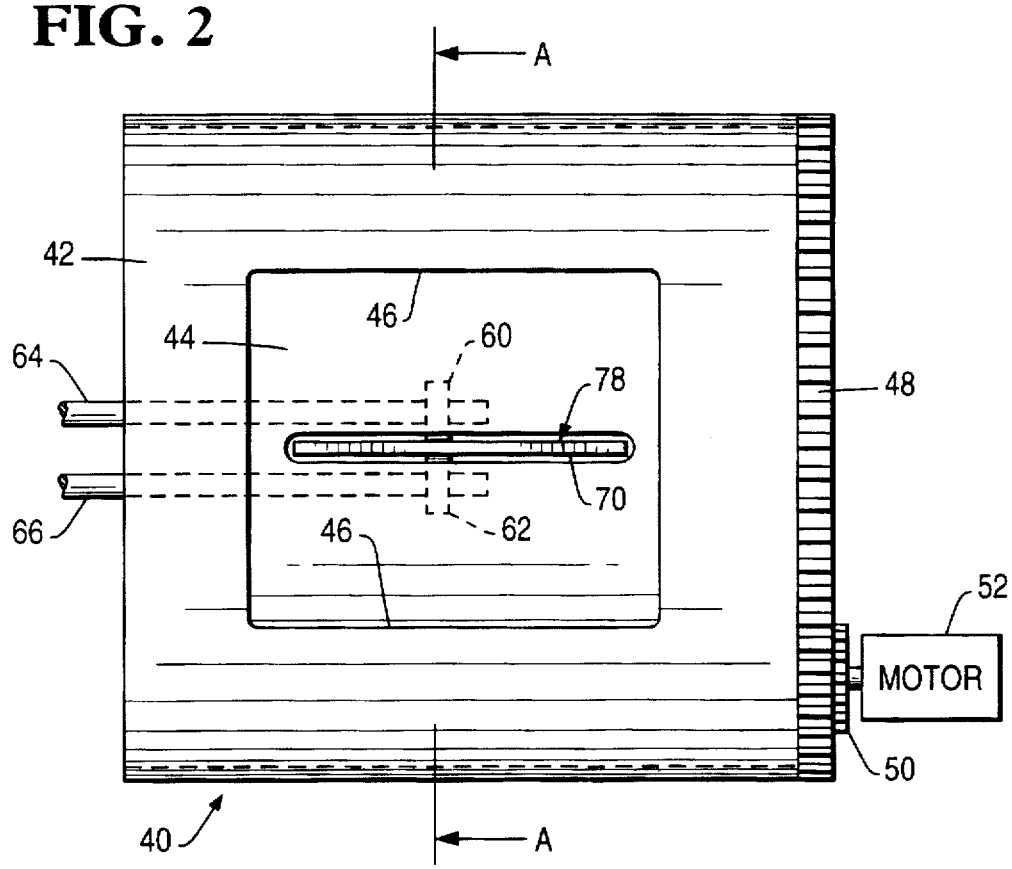
FIG. 2 is a front view of a first embodiment of a shutter mechanism for controlling the movement of a user card inserted into the ATM shown in FIG. 1.
Figure 3:
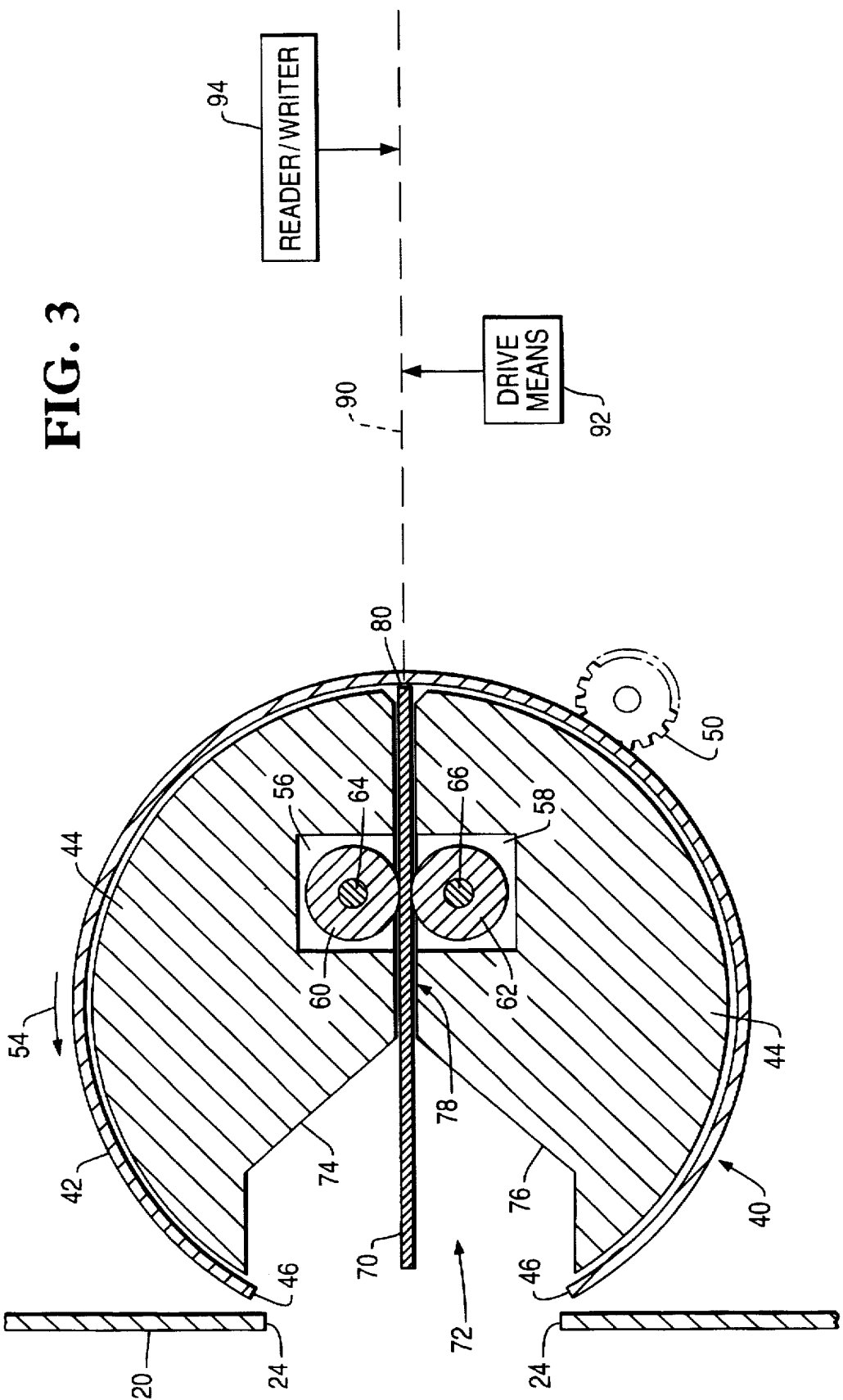
FIG. 3 is a cross-sectional view of the shutter mechanism shown in FIG. 2, with an inserted user card in a first position.

Referring now to FIG. 2, there is shown a front view of a shutter mechanism 40 which is located behind the card entry slot 24 in the housing portion 20. Referring also to FIG. 3, there is shown a cross-sectional view of the shutter mechanism 40 looking in the direction of the arrows A. FIG. 2, and showing also the slot 24 in the housing portion 20. The shutter mechanism 40 includes a hollow circular cylindrical shutter 42 which is rotatable about its axis and surrounds a fixed core 44. The shutter 42 is formed of a rigid material such as metal or plastics material and is provided with a substantially rectangular slot 46 which has a width sufficient to permit passage of a user card. Furthermore, the shutter 42 has an internal diameter sufficient to fully accommodate an inserted user card.

The shutter 42 has a gear ring 48 attached thereto, which meshes with a drive gear 50 rotatable by a motor 52. Thus, the motor 52 can be controlled to impart a rotational movement, in the direction of the arrow 54 (FIG. 3), to the shutter 42.

The core 44 is provided with elongated recesses 56,58 within which are located respective rollers 60,62 mounted on respective shafts 64,66. The rollers 60,62 can be controlled when actuated, to drive a user card 70, which has been inserted into the card slot 24 by a user of the terminal 10, as will be explained hereinbelow. The core 44 is provided with a recess 72 having angled upper and lower faces 74,76 which define a slot 78 formed in the core 44, into which a user card 70 may be inserted.

In operation, a user wishing to effect a transaction using the terminal 10 (FIG. 1) inserts a user card into the card slot 24. With the shutter 42 in the open position, as shown in FIGS. 2 and 3, the card is inserted via the slot 46 in the shutter 42 into the slot 78 in the core 44. The card 70 is inserted by the user until its inner edge 80 approaches the inner surface of the shutter 42. Since as mentioned hereinabove, the length of the card 70 is less than the internal diameter of the cylindrical shutter 42, the card 70 is now positioned wholly within the shutter.

When the inserted card 70 reaches the position shown in FIG. 3, a pair of microswitches (not shown) located adjacent the inward boundary of the core 44, are actuated and, assuming that a magnetic presensor (not shown) located in front of the rollers 60,62, senses the presence of a magnetic stripe on the card 70, the motor 52 is caused to be effective to rotate the shutter 42 from the open position shown in FIG. 3, in the direction of the arrow 54, to the closed position shown in FIG. 4. Instead of microswitches, optical sensors may be utilized.

Thus, the slot 46 is located diametrically opposite its original position, as shown in FIG. 4. Viewed by the user of the terminal 10, the shutter 42 is now in the closed position, and the user cannot access the card 70. Nor, if a fraudulent user has inserted foreign material with the card, can such foreign material be accessed by the user.

The rollers 60,62 are now operated to commence to drive the card 70 inwards through the slot 46 and along a feed path 90, see FIGS. 3 and 4. Further movement along the feed path 90 is effected under the control of drive means 92, which may include further drive rollers, or drive belts for example. The drive means 92 drives the card 70 to a location where a reader/writer unit 94 can read and/or write data from and/or onto the card 70 in accordance with the ATM transaction being effected.

Following such read and/or write operation, the card 70 is fed in a reverse direction, with the shutter 42 still in the position shown in FIG. 4. The card 70 is fed in the reverse direction until the card is again located within the cylindrical shutter 42. When the leading edge of the outwardly moving card 70 aligns with the above-mentioned microswitches (not shown) located at the inner region of core 44, a timer (not shown) is actuated and upon time-out of the timer, the shutter 42 is rotated in the direction of the arrow 54 through a further 180 degrees until the shutter is again positioned in the open position with the slot 46 directed towards the card entry slot 24. The time-out time of the timer is sufficient to allow for the outwardly moving card 70 to be positioned by the drive means 92 and drive rollers 60,62 wholly within the hollow cylindrical shutter 42, as shown in FIG. 3. The user of the terminal 10 can now withdraw the card 70 manually.

Figure 5:
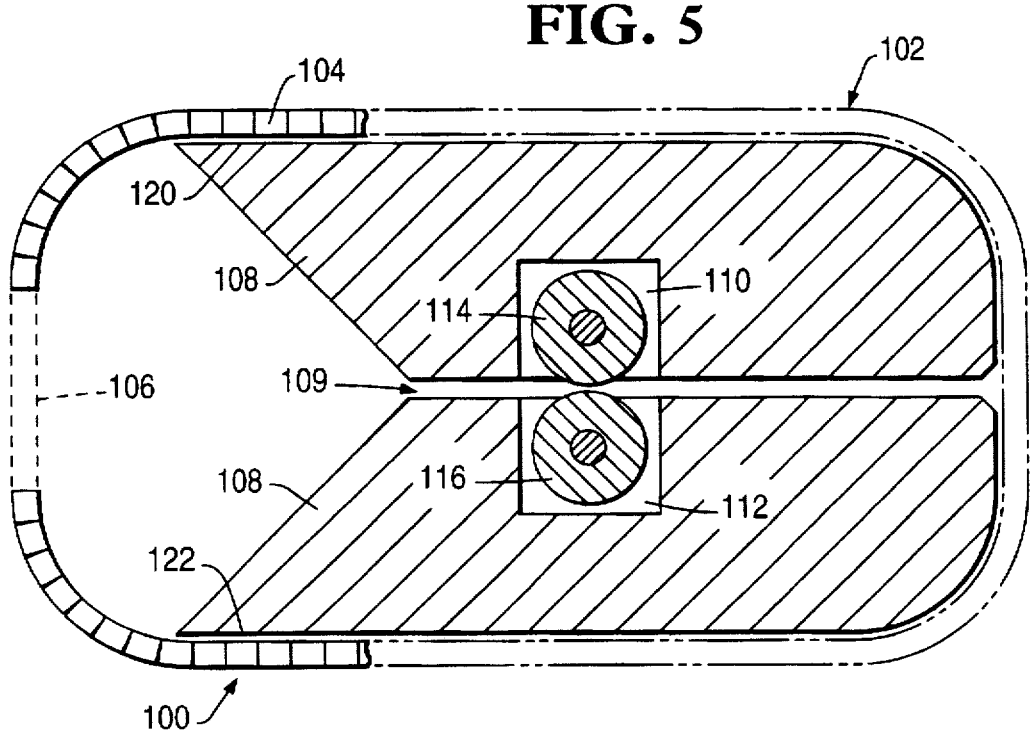
FIG. 5 is a cross-sectional view of a second embodiment of a shutter mechanism for controlling the movement of a user card.

Although in the preferred embodiment described hereinabove, the shutter 42 is formed as a hollow circular cylindrical shell, other constructions are possible. For example, the shutter could be in the form of a slatted belt. Referring to FIG. 5, there is shown a cross-sectional view of a second embodiment of a shutter mechanism 100, which includes a shutter 102 in the form of a belt formed of slats 104 joined together in the manner of a slatted belt. The shutter 102 includes a slot 106 dimensioned to enable a user's card to pass therethrough, as in the first embodiment. The shutter 102 can be driven by drive means (not shown) to move round a solid core member 108 having recessed regions 110,112 in which are located drive rollers 114, 116 for moving an inserted card, as in the first embodiment. The core member 108 has a slot 109 dimensioned to receive a user card (not shown in FIG. 5) inserted into the terminal 10. The operation of the second embodiment is generally similar to that of the first embodiment, such that the shutter 102 is either in the open position, as shown in FIG. 5, with the hole 106 aligned with the card entry slot (not shown in FIG. 5), or in the closed position, with the hole 106 at the diametrically opposed position, such that an inserted card (not shown in FIG. 5) can be driven along a feed path to a reader/writer device (not shown in FIG. 5). It will be appreciated that the shutter 102, FIG. 5, is also of cylindrical shape, but the cross-section is not necessarily circular, as in the first embodiment, but aligns with the outer surface of the core 108, which has substantially flat upper and lower portions 120,122.

Thus, there have been described embodiments of a shutter mechanism including a shutter which in a first position enables card insertion or removal but prevents access by a user to the card reader/writer unit and in a second position prevents access by a user both to the card and to the card reader/writer. Thus, it is impossible for the shutter to be in a position wherein direct access to the card reader/writer is possible from the exterior of an ATM provided with the shutter mechanism. It will be appreciated that, with the shutter in the open position, the user has access to the card, and can withdraw it if he or she wishes to do so, until the shutter has commenced to move to the closed position, that is, the user retains control of the card until shutter closure commences. Also, if the card cannot be read because it is jammed, or cannot be returned to the correct position within the hollow cylindrical shutter, the shutter will not be driven to the open position and the user will thus not be able to withdraw the card.

What is claimed is:

1. An automated teller machine (ATM) comprising:

a cash dispenser for dispensing bank notes to a user of the ATM;

a user card entry control shutter mechanism including a hollow cylindrical shutter being movable around a core member having a slot therein for receiving a user card from the user, the hollow cylindrical shutter having a dimension such that the user card can be contained therewithin;

a card reader for reading data from the user card; and a drive unit for moving the user card from the slot of the hollow cylindrical shutter to the card reader to allow the card reader to read data from the user card and thereby to allow the user to gain access to the ATM to obtain bank notes from the cash dispenser.

2. An ATM according to claim 1, wherein the shutter is drivable between a first position in which the slot is located in a position to receive the user card from the user and a second position in which the slot is located in a position to permit feeding of the user card towards the card reader, the second position being diametrically opposite the first position.

3. An ATM according to claim 2, further comprising drive means for driving the shutter from the first position to the second position when the user card is received into a location wherein the user card is wholly contained within the hollow cylindrical shutter.

4. An ATM according to claim 1, wherein the hollow cylindrical shutter is formed of a rigid material and is of a hollow circular cylindrical shape rotatable about its axis.

5. A self-service transaction terminal comprising:

a user card entry control shutter mechanism including a hollow cylindrical shutter having a slot therein for receiving a user card inserted into the terminal, the hollow cylindrical shutter having a dimension such that an inserted card can be contained therewithin, the shutter being movable around a core member having a slot therein dimensioned to receive a user card.

6. A self-service terminal according to claim 5, further comprising drive rollers located within the core member and adapted to drive an inserted user card along a feed path.

7. A self-service transaction terminal comprising:

a user card entry control shutter mechanism including a hollow cylindrical shutter having a slot therein for receiving a user card inserted into the terminal, the hollow cylindrical shutter having a dimension such that an inserted card can be contained therewithin, the shutter comprising a belt member formed of a plurality of slats.

* * * * *